Jan. 5, 1965

G. P. BAYNES ETAL 3,164,236

CLUTCH PLATES AND THE LIKE

Filed June 22, 1961

INVENTORS
GENE P. BAYNES
EDWARD W. DRISLANE

BY William P. Hickey
ATTORNEY

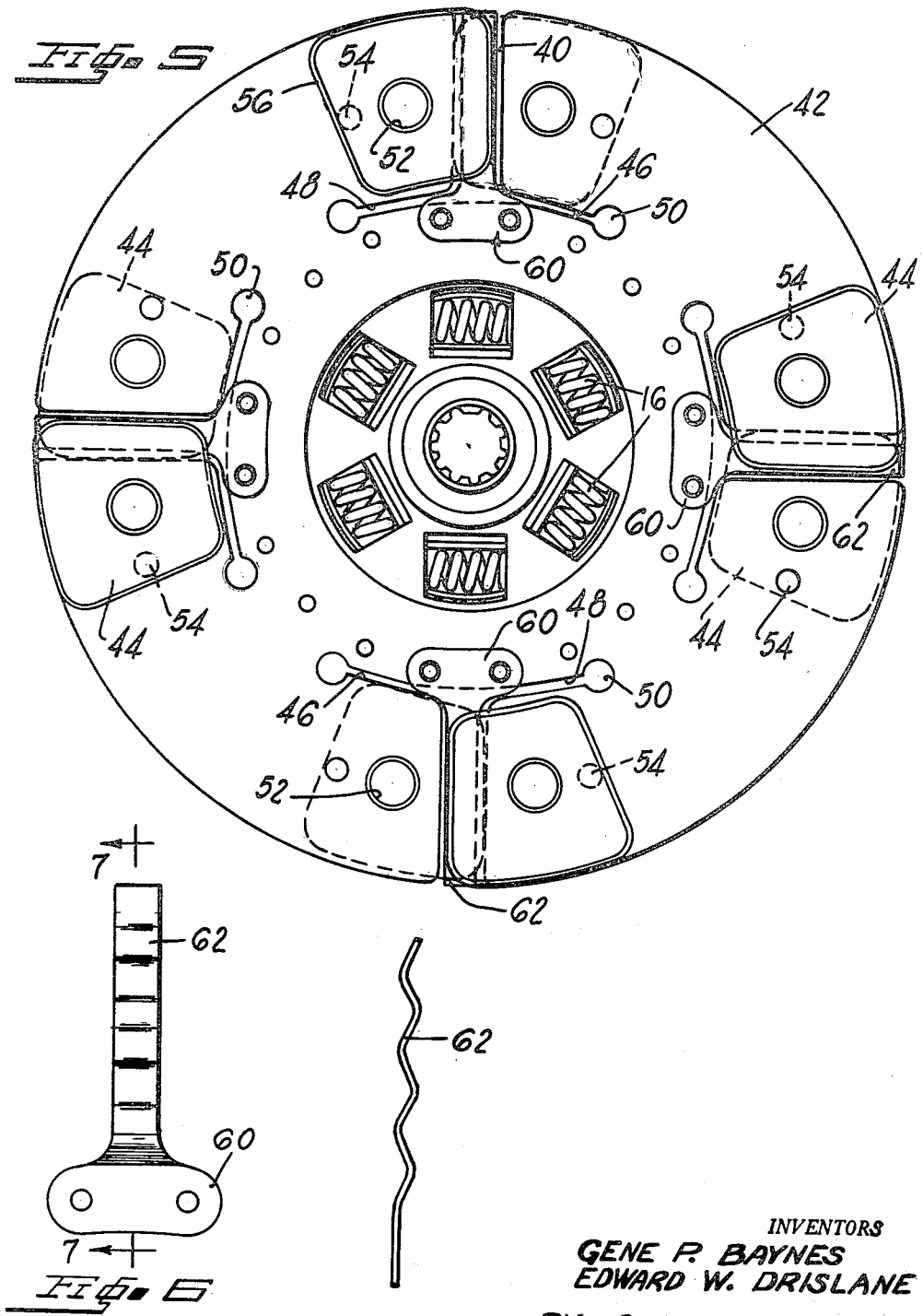

Jan. 5, 1965  G. P. BAYNES ETAL  3,164,236
CLUTCH PLATES AND THE LIKE
Filed June 22, 1961  3 Sheets-Sheet 3
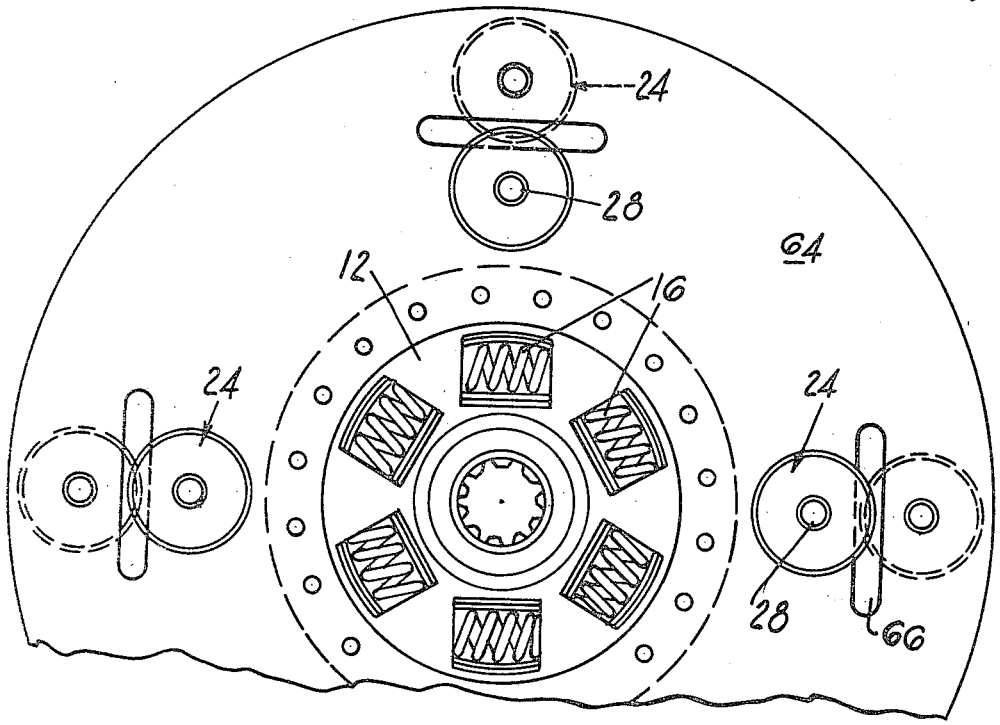
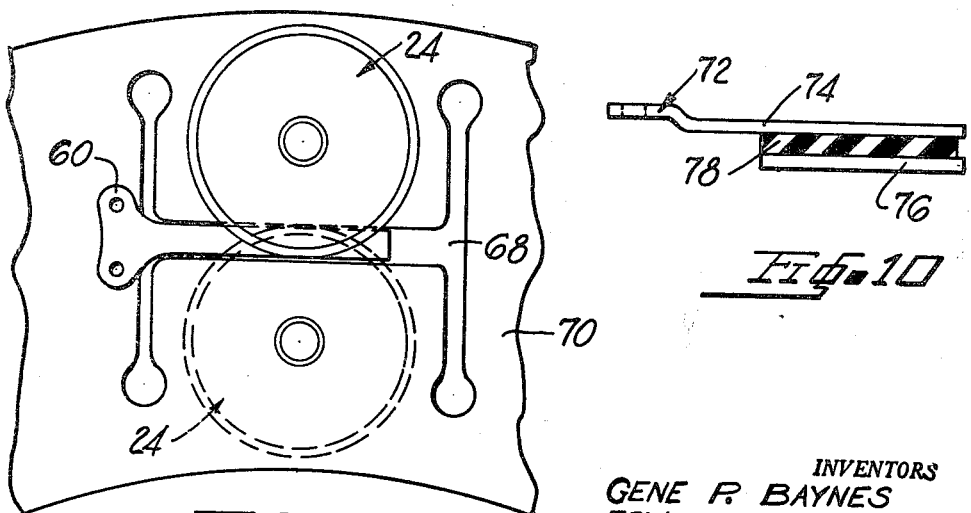
INVENTORS
GENE P. BAYNES
EDWARD W. DRISLANE
BY William P. Hickey
ATTORNEY United States Patent Office 3,164,236
Patented Jan. 5, 1965

3,164,236
CLUTCH PLATES AND THE LIKE
Gene P. Baynes and Edward W. Drislane, Green Island, Troy, N.Y., assignors to The Bendix Corporation, Green Island, Troy, N.Y., a corporation of Delaware
Filed June 22, 1961, Ser. No. 118,915
3 Claims. (Cl. 192—107)

The present invention relates to friction producing devices of the type wherein a plate structure is sandwiched between a pair of parallel opposing surfaces; and more particularly to clutch plates, disc brake structures and the like to provide a cushioning or resilient connection between the two parallel friction surfaces.

In the type of structure with which we are concerned, a plate structure having friction producing materials fastened to its opposite faces is sandwiched between a pair of parallel opposing surfaces. While such structures can be used in reciprocatory mechanisms, it has its greatest utility in rotational devices such as occurs in clutches and disc brakes.

The friction producing materials which are fixed to the opposite faces of the center plate structure (which for convenience will be hereinafter referred to as a clutch plate) are of two types. The first type is what is known in the trade as an organic friction material, and generally comprises a filler that is held together by an organic phenol formaldehyde binder. The other type of friction material which is generally used comprises a sintered powdered material which is principally a powdered metal. This latter material is known in the trade as an inorganic friction lining; and because of its brittle nature, is usually held in circular, trapezoidal or other shaped metallic cups.

Clutch plates of the type with which we are concerned are rotated about axes of rotation at high rates of speeds; so that they must be rigidly constructed to withstand the centrifugal forces to which they are subjected. The organic friction materials which are used to line the clutch plate structures are generally formed in annular rings; so that the material itself helps to withstand the centrifugal forces which are produced. As previously mentioned, the inorganic friction segments (other than annular), which of course are considerably heavier than the organic segments, are not continuous; and so the clutch plate structures on which they are mounted must be more rigid than the clutch plate for organic facings. For this reason it is generally not possible to mount the inorganic friction segments on the type of structure which has been used heretofore for supporting the organic type of friction material.

As previously mentioned, clutch structures involve a centrally located clutch plate lined with friction material which is placed between two parallel opposing surfaces that can be moved axially towards and away from each other to clamp the clutch plate therebetween. It is highly desirable in such structures to keep the axial width of the structure to a minimum; and accordingly an object of the present invention is the provision of a new and improved clutch plate, and the like, which is rigid enough to adequately support inorganic friction segments, and which at the same time has a minimum thickness between the surfaces of the friction segments which are mounted on its opposite sides.

The inorganic friction materials are hard and offer little or no resiliency in the friction material itself, whereas in organic materials there is a certain amount of resiliency in the friction material. This requires a greater need for a cushioning or resilient clutch plate structure when using inorganic friction materials. This cushionning is needed to clutches to obtain a desirable modulation of engagement to ensure smooth torque transmission and to provide good operational control of the clutch device.

In order that the frictional engagement of the clamping surfaces upon the clutch plate will be smooth, and in order that the amount of torque transmitted through the device will build up gradually, it is necessary that the clutch plate be constructed in such manner that its opposing friction surfaces are spring biased apart and will gradually resist the compressive force of the clamping parallel opposing surfaces. It is further desired that the deformation produced by the squeezing together of the clutch plate structure be limited to a predetermined amount; so that the control mechanism for the clamping plate structure can be designed for a definite fixed amount of movement. Accordingly, a further object of the present invention is the provision of a new and improved clutch plate arrangement which limits the clutch plate deformation to a fixed amount.

A further object of the present invention is the provision of a new and improved clutch plate structure of the above described type, wherein no extra parts are needed for providing the stop mechanism for the springing action of the clutch plate, and wherein the stopping mechanism is achieved by solid engagement of structure extending between the normally used friction segments.

The invention resides in certain constructions and combinations and arrangements of parts; and further objects and advantages of the present invention will become apparent to those skilled in the art to which it relates from the following description of several preferred embodiments described with reference to the accompanying drawings forming a part of this specification, and in which:

FIGURE 5 is a plan view of a clutch plate similar to that of FIGURE 1, but showing still another embodiment;

FIGURE 6 is a plan view of a marcel seen in FIGURE 5;

FIGURE 7 is a cross-section view taken approximately on the line 7—7 in FIGURE 6;

FIGURE 8 is a plan view of a clutch plate similar to that of FIGURES 1 and 5 but showing still another embodiment of the invention;

FIGURE 9 is a fragmentary view of still another embodiment of the clutch plate; and FIGURE 10 is a cross sectional view similar to FIGURE 7 showing another embodiment of a marcel.

Figure 1:
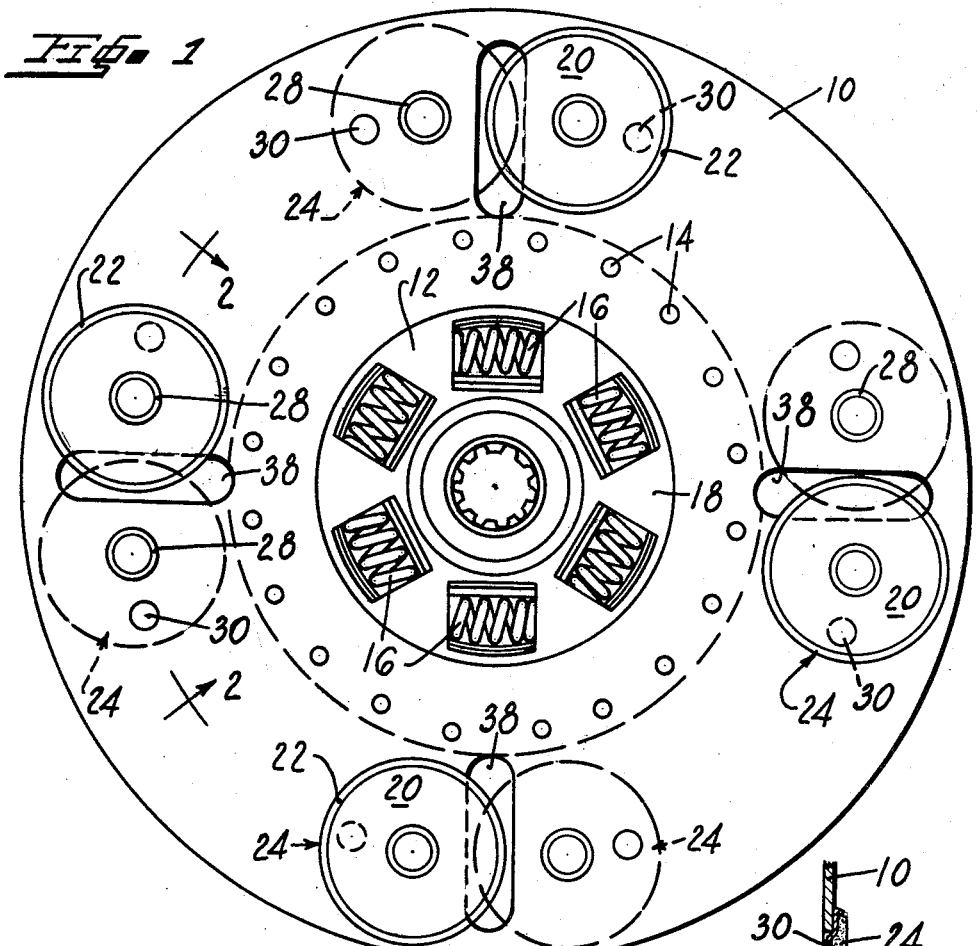
FIGURE 1 is a plan view of a clutch plate embodying principles of the present invention.

While the invention may be otherwise embodied, as for example in friction brakes etc., it is herein shown and described as embodied in a friction clutch of the type used in automotive vehicles. The clutch plate shown in FIGURE 1 generally comprises an annular disc 10 that is made from a carbon steel material having appreciable spring characteristics. The annular disc 10 is attached to a centrally located hub 12 by a plurality of rivets 14 in a conventional manner; and the hub structure 12 will be preferably provided with the usual spring structures 16 positioned between the disc 10 and the spline 18 which drives the usual power output shaft (not shown).

The opposing friction surfaces of the clutch plate are provided by means of inorganic friction material 20 which is held within annular cup structures 22 to provide the friction elements generally indicated at 24, and which are similar to the elements shown and described in the Stedman Patent 2,784,105. The friction elements 24 have a central opening 26 therein which extends through the cup 22 and friction material 20. Sidewalls of the opening 26 in the friction material 20 are tapered outwardly in the form of a cone, and the friction elements are held in tight engagement with the surface of a disc 10 by means of a tubular rivet 28, one end of which is flared outwardly to engage the sidewalls of the opening 26 in the cup 22, and the other end of which is folded over against the opposite side of the disc 10. In order to prevent rotation of the friction element 24 about the rivet 28, the bottom of the cup 22 is depressed slightly to form a dimple 30 which projects into another small opening 32 in the disc 10.

As previously indicated, it is desirable to provide a structure which yields when the parallel opposing surfaces 34 and 36, between which the clutch plate is sandwiched, are brought together against the elements 24 on opposite sides of the disc 10. It is further desired that the yielding of the clutch plate 10 will be limited to prevent any portion of the plate 10 or the connecting rivets 28, from rubbing against the opposing surfaces 34, 36 as the case may be, and thereby scoring these surfaces.

Figure 2:
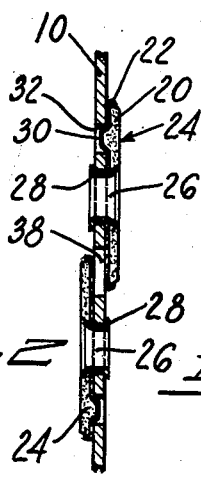
FIGURE 2 is a fragmentary cross-sectional view taken approximately on the line 2—2 of FIGURE 1.

According to principles of the present invention, these desired functions are neatly attained by separating the centers of the elements 24 on opposite sides of the disc 10 by an amount which causes a small portion of each element to overlap the other. The disc 10 is provided with a slot or opening 38 therethrough which includes the area of overlap between the opposing friction elements 24, in order that the opposite elements 24 can move toward each other in their region of overlap. It has further been found that a generally radially extending slot leaving integral portions of the plate 10 on its inner and outer ends permits a bending of the plate 10 which will provide a generally high spring rate without undue distortion of the plate 10 or uneven wear of the friction elements 24. In the normal uncompressed conditions of the clutch plate, the structure will have a configuration of that generally shown in FIGURE 2; and during the engaged condition of the clutch, the parallel opposing surfaces 34 and 36 will be biased together with sufficient force to compress the clutch plate into the condition generally shown in FIGURE 3 of the drawings. In the condition shown in FIGURE 3, each of the friction elements 24 will move approximately half way through the thickness of the clutch plate 10 to engage one another, and thereby prevent further distortion of the clutch plate. Where it is desired to further limit the permissible compressive movement of the clutch plate, the portions of the friction elements 24 which are superimposed over the openings 38 may be provided with dimples, similar to those used to provide the projections 30, which dimples engage each other and thereby limit the movement of the elements 24 toward each other.

Figure 3:
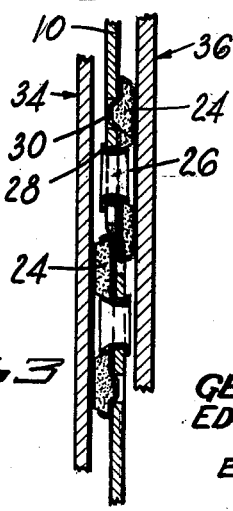
FIGURE 3 is a fragmentary cross-sectional view similar to that seen in FIGURE 2 excepting that it is shown in its maximum compressed condition.

In the operation of the structure so far described, it will be understood that the clutch plate seen in FIGURE 1 will be positioned between the flywheel 34 and backup plate 36 of a conventional clutch structure. When the clutch is in its normal disengaged condition, the opposing surfaces of the elements 34 and 36 will be spread apart to provide running clearance with the elements 24 on opposite sides of the clutch plate. As the parallel opposing surfaces of the elements 34 and 36 are allowed to move toward each other, the rotating surfaces 34 and 36 will engage the surfaces of the friction elements 24 to provide a frictional drag therewith. As the opposing surfaces 34 and 36 continue to move toward each other, greater and greater compressive force will be applied between the opposite friction elements 24 to cause the plate 10 to bend or distort towards the condition shown in FIGURE 3. As the plate 10 is moving from its flat condition shown in FIGURE 2 towards its position shown in FIGURE 3, the spring rate of the plate 10 causes increasing frictional forces to be applied to the respective opposing surfaces 34 and 36 which gradually increases the torque which is transmitted through the clutch mechanism. It has been found that the configuration of plate 10 shown in the drawing having holes 38 with integral portions on the radially inner and radially outer ends of the openings, provides a sufficient spring rate to permit suitable slippage and gradual buildup of the torque which is transmitted through the clutch. In some instances the overlapping portions of the opposite friction elements 24 engage each other (as shown in FIGURE 3), after the driven clutch plate has reached synchronism with the opposing surfaces 34 and 36. In other instances, it will be desirable to have the clutch plate 10 stiff enough so that the opposing friction elements 24 never engage each other; but in the preferred embodiment shown in the drawing, it is desired that the clutch plate 10 only be stiff enough to provide a limited deflection during the interval of clutch engagement, and thereafter reaches a solid condition wherein the back side of the friction elements 24 engage each other to prevent further deflection or movement of the friction elements. This permits the operating mechanism for the clutch to be designed to be fully operative with a definite or limited amount of travel.

Figure 4:
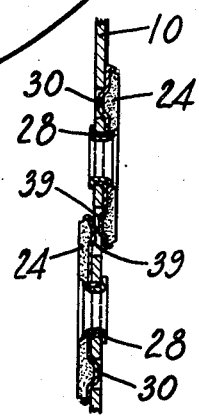
FIGURE 4 is a fragmentary cross-sectional view similar to FIGURE 2 but showing an embodiment wherein the opposing friction segments have projections thereon which limit the compressive deformation of the clutch plate structure.

The embodiment shown in FIGURE 4 is similar to that previously described, excepting that dimples 39 are added to the bottom of the opposing cups 22 to limit the deflection of the clutch plate 10.

The embodiment shown in FIGURE 5 is similar to that shown in FIGURE 1 excepting that its radially extending slots or openings 40 extend to the periphery of the clutch plate 42 and its friction elements 44 are trapezoidal in shape. The slots 40 further include laterally extending portions 46 and 48 which are positioned on opposite sides of its radial section 40, and the ends of which sections 46 and 48 terminate in circular openings 50 in order to eliminate stress concentration. As in the previous embodiment, the friction elements 44 are fastened to opposite sides of the disc 42 in pairs with the respective members of each pair positioned on opposite sides of the slot 40; so that portions of each element overlap each other and can be deflected into the radial extending slot 40. Friction elements 44 are suitably riveted to the clutch plate 42 through rivet openings 52, and the friction elements 44 are held against rotation about the rivet opening 52 by means of dimples 54 which are formed in the bottom of the elements retaining cup 56, and which extend into suitable openings 58 in the clutch plate 42. The friction elements 44 may also include another dimple spaced on the opposite side of the cup for the purpose of limiting plate deflection in the same manner shown in FIGURE 4 of the drawings. It will be seen that the friction elements 44 of the present embodiment are supported on a cantilever section of the plate 42; so that the plate bends uniformly on a generally radially extending line running between the circular opening 50 and the outside edge of the disc. The lateral portions 46 and 48 of the opening serve the purpose of relieving support along the radially inner edges of the friction elements, and thereby eliminates a twisting action of the clutch plate during clutch engagement.

The clutch plate structure so far described will have utility in some applications; but for the other applications, it will preferably include a yieldable structure or marcel 60 for biasing the friction elements 44 apart. The marcel shaped spring and abutment member 60 shown in FIGURE 6 is a generally T-shaped structure—the laterally extending portions of which are riveted to the plate 42 radially inwardly of the slot 40; and the leg portions 62 of which are positioned in the slot 40 between the overlapping portions of the friction elements 44. The legs 62 are made of a spring steel and are corrugated to bias the overlapping portions of the friction elements 44 apart with a force which gradually increases as the elements 44 are compressed together. The marcels 60 may be corrugated in either a circumferential or radial manner. The marcels 60 are preferably designed to provide approximately the same spring force as does the bending of the clutch plate 42 previously referred to and will further be designed to provide a depth of corrugation which generally equals the desired limit of movement of the friction elements 44 before "going solid." By biasing apart the portions of the friction element 44 adjacent to the free end of the cantilevered section of plate 42, the marcels 60 tend to cause the friction elements to seat more uniformly upon the parallel opposing surfaces, and thereby produce a more uniform wear pattern for the friction elements 44.

The embodiment of clutch plates shown in FIGURE 8 is in many respects similar to the embodiments above described; and differs principally therefrom in that the friction elements 24 are positioned radially inwardly and radially outwardly of slots which extend generally transversely to a plane passing through the center of the plate's axis of rotation. The friction elements shown are identical with those seen in FIGURE 1, as is the hub structure to which the annular disc 64 is suitably riveted. In the embodiment shown in FIGURE 8 the friction elements 24 which are positioned radially inwardly of the slots 66 all are positioned on the same side of the friction plate, and the friction elements 24 which are positioned radially outwardly of each of the elements are positioned on the opposite side of the annular disc 64. Inasmuch as the hub structure is free to move axially upon the splined drive shaft connection, practically no twisting of the annular disc 64 occurs with respect to its riveted connection to the central hub structure, and all of the bending of the disc 64 occurs in the portion radially outwardly of the openings 66. This need not be necessary in all instances, and it is contemplated that for some applications alternate radially inner and outer positions could be taken by the friction elements 24 which are affixed to the same side of the annular discs 64.

The embodiment shown in FIGURE 9 is quite similar to that shown and described for FIGURE 8 excepting that the slots 68 have an H configuration so as to make the annular disc 70 more flexible. With this arrangement the marcels 60 previously shown and described with respect to FIGURE 5 may also be used to yieldably bias the friction elements 24 apart.

FIGURE 10 of the drawings shows another embodiment of yieldable structure or marcel which can be positioned between the opposing friction elements to yieldably bias the friction elements apart. In the embodiment shown in FIGURE 10 a suitable rubber-like material such as a temperature resistant silicone rubber generally is bonded between two flat parallel plates 74 and 76. The yieldable structure or marcel 72 is intended to take the place of the marcel 60 previously described; so that the portions of the friction elements 24 which overlap will be biased apart by means of the resilient nature of the rubber-like material 78. The yieldable member 72 has a gradually increasing spring rate, which after a predetermined deformation, requires such a large amount of force to produce further deformation that it effectively limits the movement of the friction members 24 towards each other. As with the marcel 60 therefore, there is a positive stopping arrangement positioned directly between opposite friction members 24, for limiting their movement toward each other.

It will be apparent that the objects heretofore enumerated as well as others have been accomplished; and that there has been provided clutch plate structures which provide the necessary travel for smooth frictional engagement by means of deflection of the clutch plate itself; and further provides a means for limiting this travel to a predetermined amount by permitting the friction elements on opposite sides of the disc to "go solid." This has been accomplished without adding extra thickness to the clutch plate structure which would place restrictions on the total clutch mechanism design.

While the invention has been described in considerable detail, we do not wish to be limited to the particular constructions shown and described; and it is our intention to cover hereby all novel adaptations, modifications and arrangements thereof which come within the practice of those skilled in the art to which the invention relates.

We claim:

1. A circular clutch plate and the like for sandwiching between parallel opposing surfaces which rotate about a common axis and comprising: a circular plate member having a central axis of rotation and a plurality of equally spaced generally narrow radially extending openings therethrough; a pair of opposing friction producing members for each opening, one member of each pair being positioned on one side of said plate member with a portion projecting over one side of said opening, and the other member of each pair being positioned on the opposite side of said plate with a portion projecting over the opposite side of said opening, said opening extending to the periphery of said circular plate, said opening including portions extending circumferentially along the radially inner edges of said pair of opposing friction producing members, and a marcel shaped spring and abutment member positioned in said opening between said pair of opposing friction producing members to bias them apart and limit movement of said pair toward each other.

2. A circular clutch plate and the like for sandwiching between parallel opposing surfaces which rotate about a common axis and comprising: a circular plate member rotatable about a central axis; a pair of friction producing members respective ones of which are positioned on opposite sides of said plate member, said friction producing members being offset so that only a portion of each overlies the other, and said plate having an opening therethrough in the region between said overlying portions of said friction producing members to make said plate flexible and through which opening said overlying portions of said friction producing members move when compressive force is applied to said opposing friction producing members; said opening extending to the periphery of said circular plate, and said opening including portions extending circumferentially along the radially inner edges of said pair of opposing friction producing members, and a marcel shaped spring and abutment member positioned in said opening between said pair of opposing friction producing members to bias them apart and limit movement of said pair toward each other.

3. A circular clutch plate and the like for sandwiching between parallel opposing surfaces which rotate about a common axis and comprising: a circular plate member having a central axis of rotation and a plurality of spaced generally narrow radially extending openings therethrough; a pair of opposing friction producing members for each opening, one member of each pair being positioned on one side of said plate member with a portion projecting over one side of said opening, and the other member of each pair being positioned on the opposite side of said plate with a portion projecting over the opposite side of said opening, each of said radially extending openings being spaced from one another relative to the size of said friction members to provide a spaced distance circumferentially between each pair of opposing friction producing members.

References Cited in the file of this patent

UNITED STATES PATENTS

| | | |
|---|---|---|
| 1,479,973 | Sturt et al. | Jan. 8, 1924 |
| 2,117,728 | Katcher | May 17, 1938 |
| 2,201,339 | Hunt | May 21, 1940 |
| 2,888,122 | Garmager | May 26, 1959 |
| 2,986,252 | Du Bois | May 30, 1961 |

FOREIGN PATENTS

| | | |
|---|---|---|
| 301,962 | Italy | Oct. 15, 1932 |